US009582328B1

United States Patent
Tao et al.

(10) Patent No.: US 9,582,328 B1
(45) Date of Patent: Feb. 28, 2017

(54) ALLOCATION OF RESOURCES IN COMPUTING ENVIRONMENTS

(71) Applicant: EMC Corporation, Hopkinton, MA (US)

(72) Inventors: Simon Tao, Shanghai (CN); Yu Cao, Beijing (CN); Xiaoyan Guo, Beijing (CN); Kenneth Durazzo, San Ramon, CA (US); John Cardente, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/744,268

(22) Filed: Jun. 19, 2015

(51) Int. Cl.
*G06F 9/46* (2006.01)
*G06F 9/50* (2006.01)
*G06F 9/445* (2006.01)
*G06N 5/02* (2006.01)

(52) U.S. Cl.
CPC ......... *G06F 9/5011* (2013.01); *G06F 9/44505* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 2012/0005435 A1* | 1/2012 | Emaru | G06F 3/0608 711/154 |
| 2012/0166644 A1* | 6/2012 | Liu | G06F 9/4856 709/226 |
| 2016/0011900 A1* | 1/2016 | Reddy | H04L 67/38 718/1 |

OTHER PUBLICATIONS

Yao et al. "Multi-Dimensional Scheduling in Cloud Storage Systems," Jun. 8-12, 2015.*

* cited by examiner

*Primary Examiner* — Sisley Kim
(74) *Attorney, Agent, or Firm* — Ryan, Mason & Lewis, LLP

(57) ABSTRACT

A specification of resource requirements is received. One or more resource configurations for a computing environment that satisfy the specification of resource requirements are generated utilizing a description of available resources in the computing environment. A model is utilized to estimate a level of service for each of the resource configurations, wherein the model predicts behavioral dependencies between attributes of the resources in the computing environment. A given one of the resource configurations is selected based at least in part on the estimated levels of service, and resources in the computing environment are assigned according to the selected configuration of resources.

19 Claims, 12 Drawing Sheets

100

200

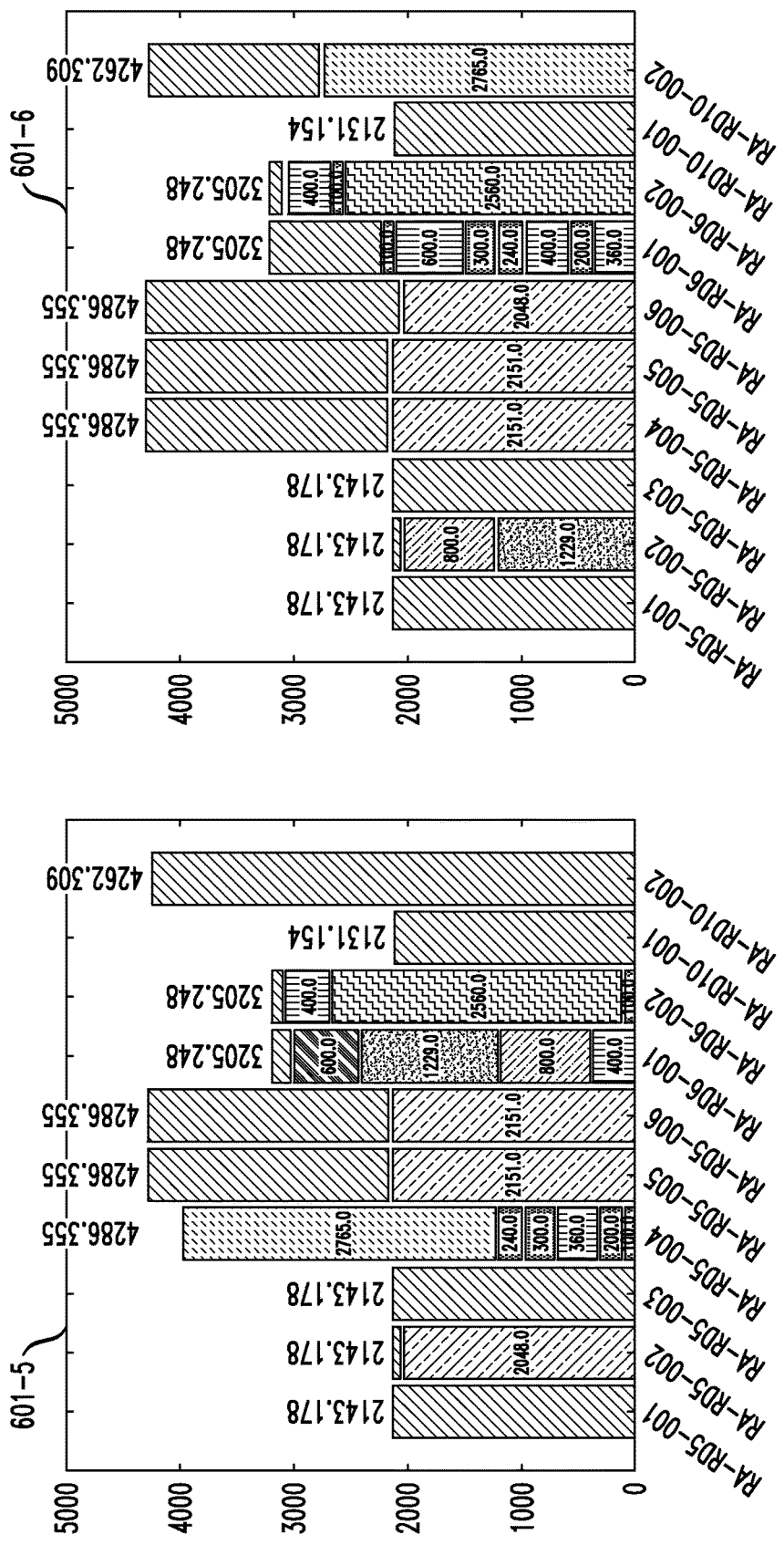

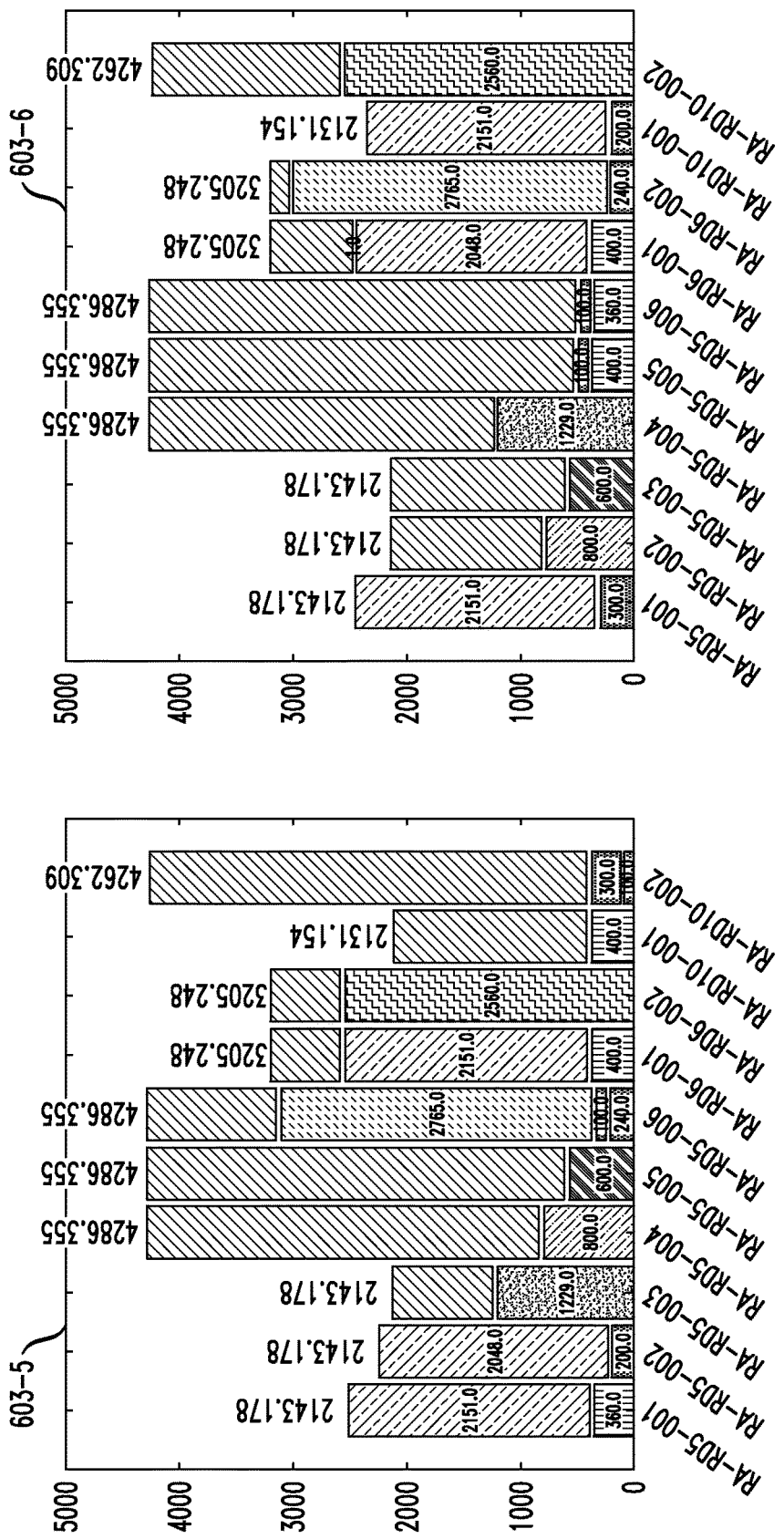
FIG. 6 cont.−5

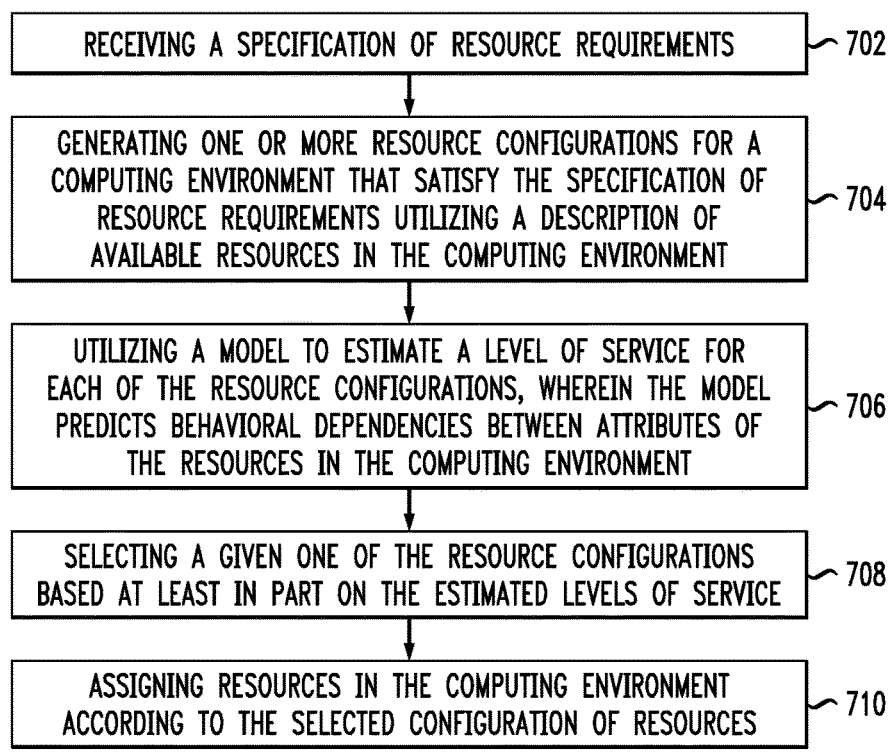
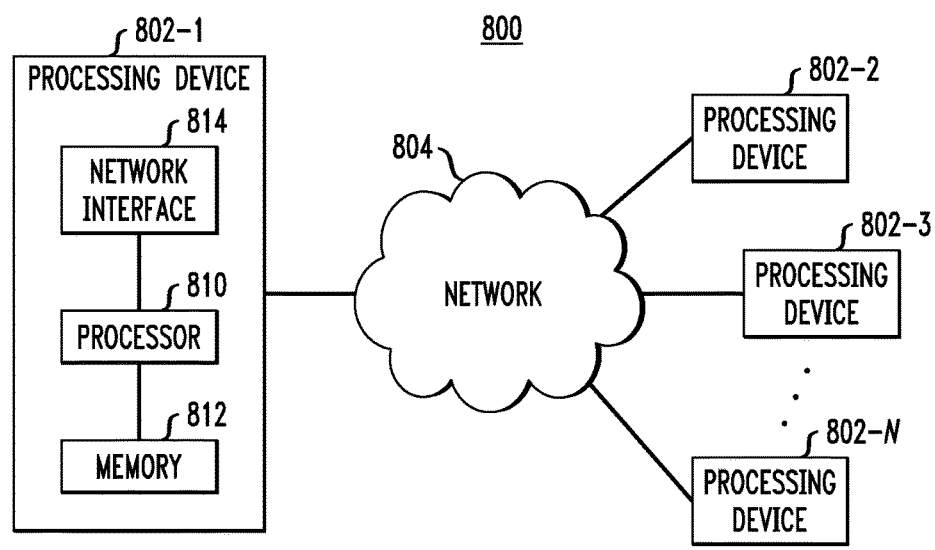

ALLOCATION OF RESOURCES IN COMPUTING ENVIRONMENTS

FIELD

The field relates generally to computing environments, and more particularly to allocation of resources in such computing environments.

BACKGROUND

A software-defined data center (SDDC) is a computing system wherein elements of the infrastructure, e.g., networking, storage, compute, etc., are virtualized and delivered to tenants (customers) of the data center as services. An SDDC is typically implemented in a cloud computing platform environment and the virtualized and delivered components are controlled through an Infrastructure-as-a-Service (IaaS) layer.

The proliferation of applications and complexity of the underlying infrastructure in computing environments such as SDDCs and other cloud computing environments is rapidly increasing. As such environments increase in scale, management becomes a difficult task.

SUMMARY

Embodiments of the invention provide techniques for allocation of resources in computing environments.

For example, in one embodiment, a method comprises the following steps. A specification of resource requirements is received. One or more resource configurations for a computing environment that satisfy the specification of resource requirements are generated utilizing a description of available resources in the computing environment. A model is utilized to estimate a level of service for each of the resource configurations, wherein the model predicts behavioral dependencies between attributes of the resources in the computing environment. A given one of the resource configurations is selected based at least in part on the estimated levels of service, and resources in the computing environment are assigned according to the selected configuration of resources.

Advantageously, illustrative embodiments provide techniques for efficient and effective resource allocation in computing environments. While the techniques are applicable to a wide range of computing systems, illustrative embodiments are implemented with large-scale computing environments such as cloud computing environments and SDDC infrastructure.

These and other features and advantages of the invention will become more readily apparent from the accompanying drawings and the following detailed description.

BRIEF DESCRIPTION OF THE DRAWINGS

FIG. 7 illustrates a methodology resource allocation, according to an embodiment of the invention.

FIG. 8 illustrates a processing platform used to implement a resource allocation system, according to an embodiment of the invention.

DETAILED DESCRIPTION

Figure 1:
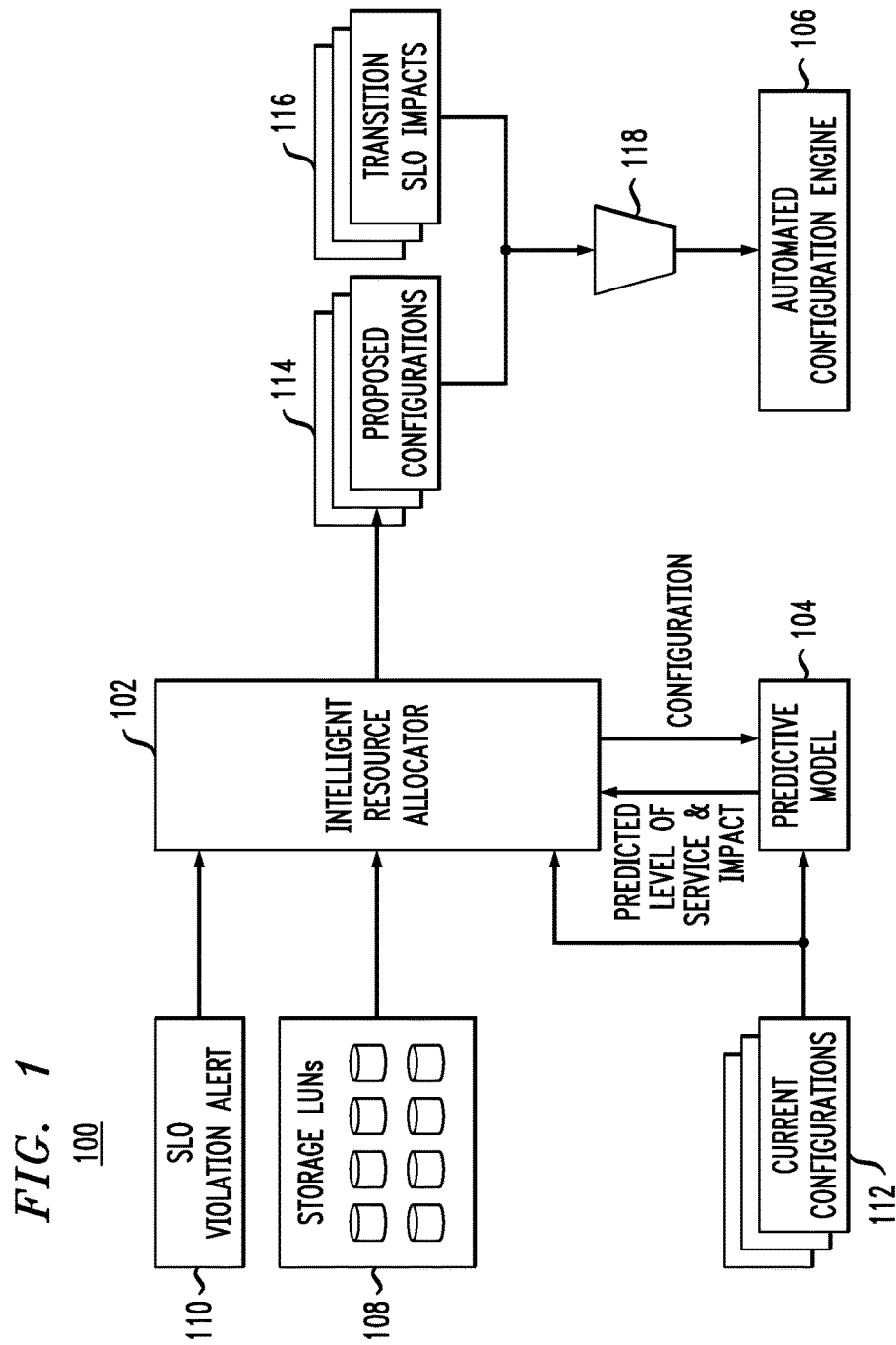
FIG. 1 illustrates a resource allocation system, according to an embodiment of the invention.

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "cloud platform," "data repository," "data center," "data processing system," "data storage system," "computing system," "computing environment," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

It is realized herein that resource allocation in large-scale computing environments is a difficult task. Manual allocation of resources is practicable at a small scale, but in large-scale computing environments such as cloud computing environments and SDDCs, combinatorial complexity grows rapidly and makes it hard for system administrators to find optimal or near-optimal configurations of resources. Consider, as an example, storage systems. Various applications in a cloud computing environment utilize different types and amounts of storage. With multi-tenancy and the proliferation of applications in cloud computing environments, it is difficult to manually configure storage resources in an optimal or near-optimal manner. In addition, management costs for such manual configuration of resources may be prohibitively large.

Therefore, a need exists for automating the configuration of resources in computing environments such as cloud computing environments and SDDCs. Such automated configuration should also seek to find a most appropriate, optimal or near-optimal configuration of resources. A key challenge for hosting a massive converged infrastructure, such as a cloud computing environment or SDDC, is to automate storage allocation so that storage infrastructure can be configured appropriately in a timely and reliable manner.

Intelligent storage allocation requires matching multi-dimensional storage requirements to available resources. Storage requirements may, for example, specify dimensions such as capacity or volume size, Input/Output Operations Per Second (IOPS), bandwidth or throughput, latency, etc. In large-scale infrastructure deployments such as cloud computing environments and SDDCs, the demands for effective and efficient resource allocation solutions is well beyond human capability. Since solutions based on human reasoning do not scale well with the increase of deployment complications, an intelligent resource allocator is highly desirable as a further step toward a higher level of infrastructure intelligence and management automation.

Policy-based resource allocation solutions are typically best-effort approaches. In such approaches, decision making in a request-to-resource mapping is activated by a set of predefined conditions. In large-scale infrastructure deployments, however, the underlying dynamic and sophistication in intelligent resource allocation is hard to capture by policy-based approaches which typically suffer from high management costs. In addition, policy-based approaches may be too rigid, not allowing flexibility in complex large-scale environments.

In order to overcome the above and other drawbacks with conventional resource allocation approaches, illustrative embodiments provide a highly effective and efficient framework for resource allocation. Some embodiments provide a generic framework with an optimization engine to allow for generation of resource configurations that minimize or reduce overall cost subject to satisfying various service level agreement (SLA) constraints.

As an example, illustrative embodiments may be utilized for at-scale storage allocation and may be seamlessly integrated in large-scale deployments such as cloud computing environments and SDDCs. While various embodiments are described below with respect to allocation of storage resources, embodiments are not so limited. Instead, systems to be described below may be used for allocation of various other types of resources, including by way of example compute and networking resources in a cloud computing environment or SDDC.

In large-scale computing environments, the allocation of storage resources is often a substantial challenge. An optimal or near-optimal allocation of storage resources involves a number of requirements. First, a mapping process needs to match storage requirements with storage devices or storage pools having adequate capacity. Second, the mapping process needs to properly match dimensions for the storage requirements. Such dimensions may include performance dimensions such as IOPS, bandwidth and latency. Other possible dimensions include, by way of example, dimensions relating to storage capabilities such as media type, protection scheme and data services. Third, the mapping processing should be applicable for at-scale storage allocation scenarios in computing environments such as cloud computing environments and SDDCs.

Considering the above requirements, some embodiments provide a generic framework for intelligent storage resource allocation to accomplish optimized mapping from storage requirements to available resources while ensuring SLA fulfillment by accounting for complex storage behaviors and capabilities. In large-scale computing environments, the possible solution space is very large. An optimal or near-optimal solution for such an allocation problem is accomplished by effective searching in the very large solution space, using various techniques to be described below.

FIG. 1 illustrates an example of a resource allocation system 100. The system 100 is configured to map resource requirements to available resources. In some embodiments, the system 100 starts with a framework that solves an at-scale resource allocation problem in general with predictive modeling to account for complex resource behaviors and capabilities. The system 100 includes an intelligent resource allocator component 102, a predictive modeling component 104 and an automated configuration engine 106.

Intelligent resource allocator 102 generates resource configurations that satisfy a set of resource requirements. Intelligent resource allocator 102 utilizes various optimization algorithms to find matches between the resource requirements and available resources. The intelligent resource allocator 102 may receive a specification of resource requirements, which in system 100 illustratively includes a set of requirements for storage logical units (LUNs) 108. The storage LUNs 108 may have different dimensions associated therewith. For example, different ones of the storage LUNs may have different capacities or volume size, or different specified performance characteristics. As noted above, while various embodiments are described with respect to allocation of storage resources, embodiments are not limited solely to allocation of storage resources. Instead, the system 100 may be utilized for allocating various types of resources, including by way of example compute and networking resources in a cloud computing environment or SDDC. The intelligent resource allocator 102 is also coupled to an SLO violation alert component 110.

Predictive modeling component 104 is coupled to the intelligent resource allocator 102. The predictive modeling component 104 is configured to receive resource configurations from the intelligent resource allocator 102, and to provide predicted level of service (LOS) and impact information to the intelligent resource allocator 102. The predictive modeling component 104 utilizes one or more models to predict behavioral dependencies between attributes of the resources in a computing environment. In some embodiments, the predictive modeling component 104 predicts such behavioral dependencies utilizing observed measurements from current configurations 112. Behavioral dependencies include, by way of example, relationships between different performance dimensions of a resource. In a storage context, for example, increasing IOPS may decrease bandwidth and increase latency. As another example, some data services such as data protection by replication may result in increased latency. Various other behavioral dependencies may be predicted in other embodiments, including behavioral dependencies between different types of resources, such as relationships between dimensions of storage, compute and networking resources. Resource allocation decisions can be improved by predicting and accounting for such behavioral dependences.

Automated configuration engine 108 receives proposed configurations 114 from the intelligent resource allocator 102. The automated configuration engine 106 interacts with backend infrastructure to assign resources according to one of the proposed configurations 114. In some embodiments, the assignment of resources by the automated configuration engine 106 is fully automated. In other embodiments, a system administrator may choose or approve one of the proposed configurations 114.

In some embodiments, the intelligent resource allocator 102 further predicts transition costs associated with one or more of the proposed configurations 114. Transition cost prediction accounts for the impact of applying each proposed configuration 114 on existing SLOs of the computing environment. The intelligent resource allocator 102 may integrate with various monitoring tools of a computing environment to identify how to remediate SLO violations. SLO violations may be reported via the SLO violations alert component 110.

Such monitoring tools may include, by way of example, EMC Storage Resource Management (SRM) Suite/Watch4Net, RSA Security Analytics (SA) and OpenStack Ceilometer. EMC SRM/Watch4Net is a monitoring tool designed for monitoring storage performance and SLAs. RSA SA is a monitoring tool designed for use in security analytics by capturing network traffic. OpenStack Ceilometer is a monitoring tool designed for monitoring the use of resources and monitoring the health of the OpenStack computing environment, which is an example of a cloud computing environment and SDDC. OpenStack is a software platform that controls pools of compute, storage, and networking resources throughout a data center, managed through a dashboard or via the OpenStack application programming interface (API). OpenStack operates with enterprise and open source technologies enabling use with a wide variety of heterogeneous infrastructure components.

The intelligent resource allocator 102 may provide the predicted transition costs as transition SLO impacts 116 to the automated configuration engine 106. In some embodiments, evaluator 118 may combine respective ones of the proposed configurations with corresponding ones of the transition SLO impacts 116 received from the intelligent resource allocator 102 and output the configuration that results in the lowest overall cost to the automated configuration engine 106. The overall cost is the sum of the cost of the configuration and its associated transition costs.

Figure 2:
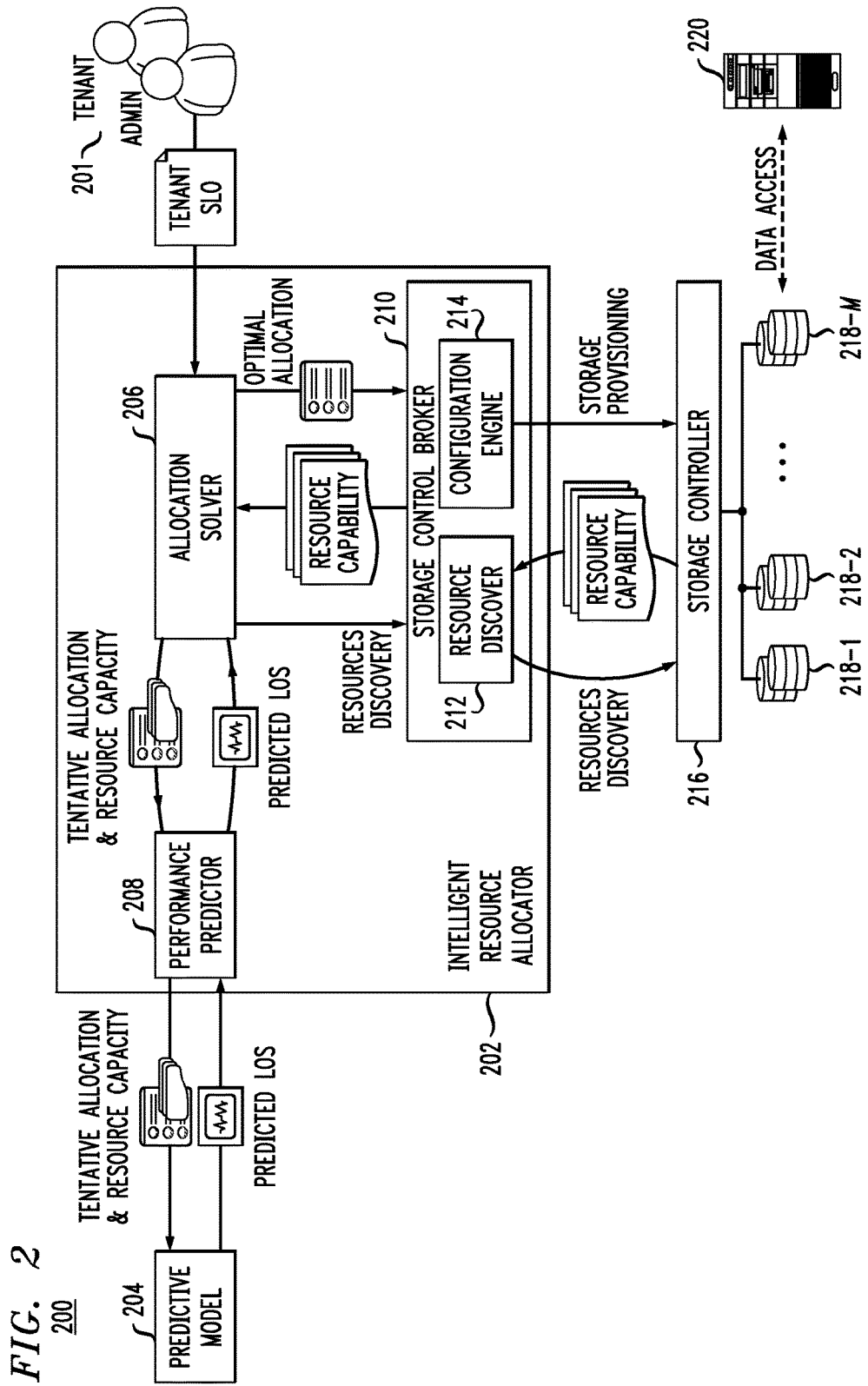
FIG. 2 illustrates another resource allocation system, according to an embodiment of the invention.

An example of storage resource allocation will now be described with respect to FIG. 2, which shows resource allocation system 200. In some embodiments, a storage resource allocation problem is defined as generating an optimal or near-optimal storage allocation that minimizes or reduces overall storage cost while satisfying one or more SLA constraints.

The system 200 includes intelligent resource allocator 202 and predictive modeling component 204. The intelligent resource allocator 202 includes allocation solver component 206, performance predictor component 208 and storage control broker component 210. The storage control broker 210 includes resource discovery module 212 and configuration engine 214. The storage control broker 210 is configured to communicate with a storage controller 216 controlling storage pools 218-1, 218-2, . . . 218-M. Server 220 is a computing device which hosts applications that read and write data to the storage pools 218. Each storage pool 218 may represent a separate physical storage device, a set of physical storage devices, etc.

The intelligent resource allocator 202 receives a set of tenant SLOs from an administrator or tenant 201. Allocation solver 206 conducts effective optimal or near-optimal solution searching. Valid solutions or resource configurations are evaluated according to an estimation of incurred cost. The overall cost is the sum of the operating costs for each used storage LUN in the resource configuration. Operating costs may include both fixed and dynamic costs, as will be described in further detail below.

Allocation solver 206 provides proposed resource configurations to the performance predictor 208. A proposed resource configuration may include a tentative allocation and resource capacity, which may be forwarded from the performance predictor 208 to the predictive modeling component 204. The predictive modeling component 204 performs functionality similar to that of the predictive modeling component 104 described above with respect to system 100. For example, the predictive modeling component 204 provides a predicted LOS for the tentative allocation and resource capacity. The performance predictor 208 may further utilize a predictive model that accounts for non-trivial storage device behavior that is pertinent to SLA fulfillment. For example, the performance predictor 208 may utilize a model to predict and account for the metadata overhead implied from each LUN allocation.

Storage control broker 210 interacts with backend storage via storage controller 216. The storage control broker 210 receives resource discovery requests from the allocation solver 206. Resource discovery module 212 of the storage control broker 210 interacts with the storage controller 216 to discover resource capabilities of the storage pools 218 managed by storage controller 216. Such resource capabilities are sent back to the allocation solver 206 by the storage control broker 210. The storage control broker 210 also receives an optimal or near-optimal allocation from the allocation solver 206. The configuration engine 214 of the storage control broker 210 configures or provisions the optimal or near-optimal allocation by communicating with the storage controller 216 as shown in FIG. 2.

Figure 3:
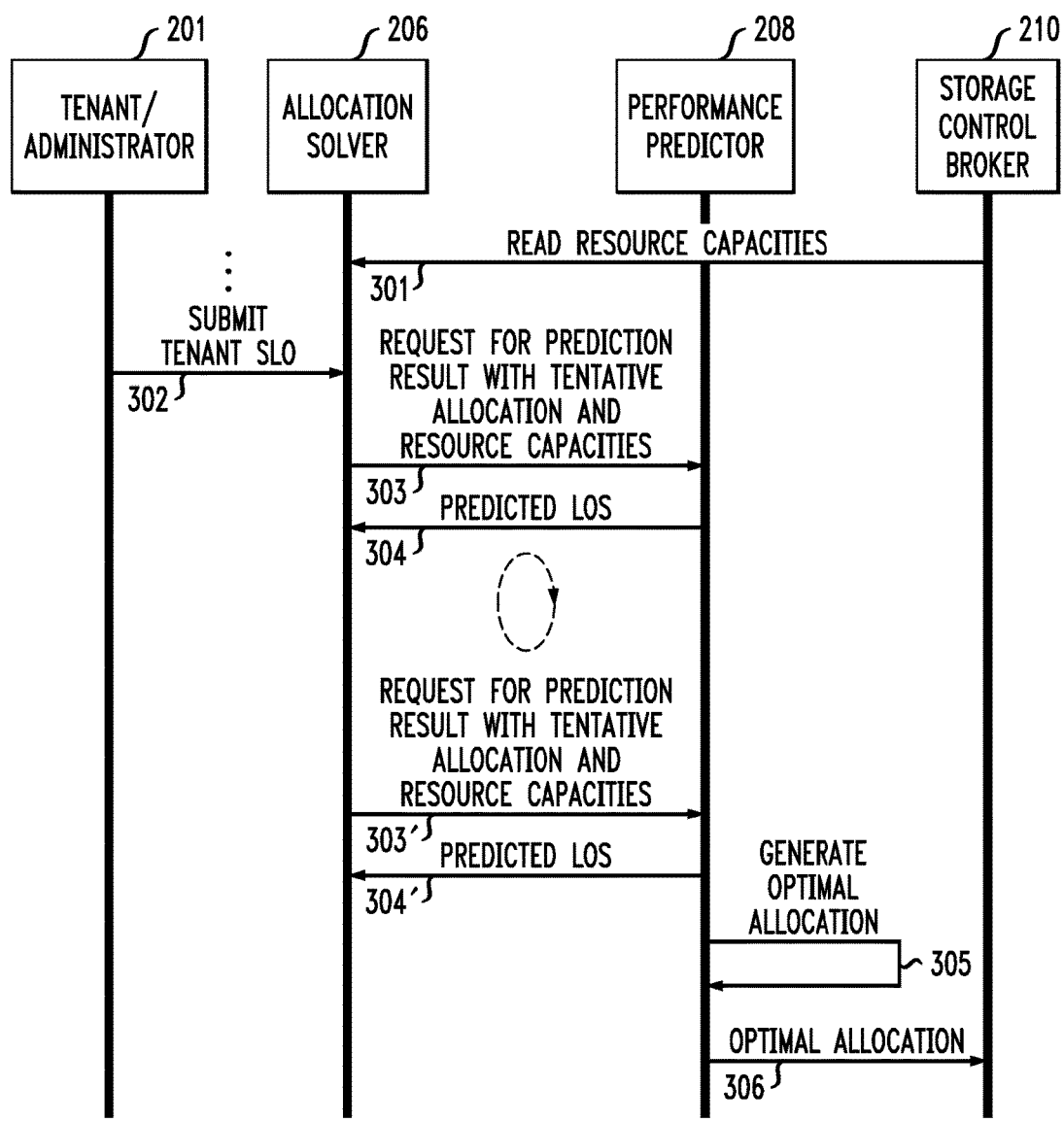
FIG. 3 illustrates a methodology for resource allocation utilizing the resource allocation system of FIG. 2, according to an embodiment of the invention.

FIG. 3 illustrates a process 300 for storage allocation performed by the system 200. The process 300, in fulfilling a goal of finding an optimal or near-optimal storage allocation, utilizes the allocation solver 206 of the system 200 to take as input capacity specifications from storage infrastructure and required storage capacities from a system administrator or tenant 201. Searching in the huge solution space for a near-optimal storage allocation is effectively conducted by repeatedly invoking the performance predictor 208 for tentative allocations with an approximation algorithm.

The process 300 begins with step 301, where the allocation solver 206 reads as input a description of available storage resources with free capacity from the storage control broker 210. This description of available storage resources is obtained by the storage control broker 210 utilizing resource discovery module 212. As described above, the resource discovery module 212 sends a resource discovery request to the storage controller 216, and receives resource capabilities including a description of available storage resources in response.

In step 302, a system administrator or a tenant 201 submits SLOs to the allocation solver 206. The SLOs include storage requirements, such as capacity specifications. In step 303, the allocation solver 206 generates a resource configuration including a tentative allocation and resource capabilities and forwards a request to the performance predictor 208 for a prediction result using the tentative allocation. The performance predictor 208, in conjunction with the predictive modeling component 204, generates a predicted LOS for the tentative allocation. The predicted LOS is sent from the performance predictor 208 to the allocation solver 206 in step 304. In steps 303' and 304', steps 303 and 304 are repeated for different tentative allocations of storage resources.

The performance predictor 208 utilizes an objective function to generate an optimal or near-optimal allocation or storage configuration utilizing the predicted LOSs for the different tentative allocations in step 305. In step 306, the optimal or near-optimal allocation is sent to the storage control broker 210 for provisioning on the storage pools 218.

Resource allocation is the process of mapping resource requirements to available resources. In some embodiments, resource allocation takes into account SLA fulfillment as well as resource management costs. Various examples of techniques which may be used to generate an optimal or near-optimal resource configuration are described below with respect to generating an optimal storage allocation. Embodiments, however, are not limited solely to allocating storage resources but instead may be more generally applied to allocating compute and networking resources, along with any combination of storage, compute and networking resources.

In some embodiments, storage allocation is viewed as a multi-dimensional bin-packing problem. Individual storage pools from which application-visible LUNs are to be allocated are considered as bins, which have different dimensions such as capacity or volume size, IOPS, bandwidth, latency, etc. LUNs requested by applications are considered as objects or items to be packed into such bins. Embodiments utilize a scalable approach that produces mappings between such objects and bins while minimizing or reducing operating costs.

Embodiments may utilize a variety of combinatorial optimization techniques to solve the multi-dimensional bin packing problem. Some embodiments utilize a variant referred to herein as Variable Size Bin Packing Problem with Fixed Costs (VSBPPFC), in which a set of items are packed into heterogeneous bins with different volumes and fixed costs. A heuristics algorithm referred to herein as Adapted Best Fitting Decreasing (A-BFD) is utilized in some embodiments to solve the VSBPPFC allocation problem.

A number of principles are used in developing the A-BFD algorithm for storage allocation used in some embodiments. For example, when picking an item to pack the A-BFD algorithm favors items with a large volume size as those items should be allocated before the storage space becomes too fragmented. As another example, when picking candidate bins, the A-BFD algorithm favors small bins that have been used. As a further example, the A-BFD algorithm selects low cost/volume ratio bins over bins having high cost/volume ratios, which is beneficial for minimizing or reducing the total cost of the storage allocation. If packing cannot take full advantage of the free capacity from low cost/volume ratio bins, bins with a high cost/volume ratio but low absolute cost take precedence to further minimize or reduce the total cost of the storage allocation.

Various other principles and design guidelines may be used to customize the A-BFD algorithm for a particular scenario. For example, in some embodiments a system administrator or tenant may specify that a high-performance storage allocation is required. In this case, the A-BFD algorithm may favor utilizing storage pools having high IOPS, even if there are other storage pools which are larger or have a lower cost/volume ratio. As another example, a system administrator or tenant may specify that a high-reliability storage allocation is required. In this case, the A-BFD algorithm may favor utilizing storage pools with greater reliability characteristics even if there are other storage pools which are larger or have a lower cost/volume ratio. Various other examples are possible, and the A-BFD algorithm may be modified to account for the specified resource requirements.

In some embodiments, the A-BFD algorithm operates as follows. The items, in this example the requested LUNs, are sorted in non-increasing order of their respective volumes. Items are loaded sequentially according to this order, such that the requested LUNs are selected from largest volume size to smallest volume size. An attempt is made to load each item into the "best" already-selected bin. An already-selected bin refers to a storage pool that has at least one LUN already allocated thereto. If the attempt to load an item into the best already-selected bin fails, the next-best already-selected bin is selected and an attempt is made to load the item into the next-best already-selected bin. This process repeats and cycles through each already-selected bin. If loading the item into each already-selected bin fails, a new bin is selected and the item is loaded into the new bin.

The "best" already-selected bin may be defined in a variety of ways. Bins may be sorted into two sets, the already-selected bins and thus unused bins. The already-selected bins are those bins that already have at least one LUN mapped thereto while the unused bins are those bins that do not have any LUN mapped thereto. As one example, the best already-selected bin may be the bin which, after accommodating the currently selected LUN, has the least amount of free space left to help achieve more consolidated packing overall. As another example, the best bin may be the already-selected bin having the most available free space. As a further example, the best bin may be the already-selected bin having the highest IOPS or other performance characteristic. Various other dimensions may be used for determining the best already-selected bin, including storage cost, reliability, etc. Combinations of such dimensions may also be used to select the best already-selected bin. As an example, each bin may be assigned a score or value using weights for its different dimensions such as free space, storage cost, performance characteristics, etc.

The "new" bin may be selected from amongst the bins to which no LUN has been allocated in a similar fashion based on the dimensions of the bins. For example, the new bin may be selected based on the unit cost/volume ratio associated with the bins, to thus favor low-cost storage. As other examples, the new bin may be selected as the bin having the highest reliability, the bin having the highest IOPS or other performance characteristic, etc. Again, combinations of such dimensions may be used to select the new bin by assigning scores or values to each bin using weighted values of the dimensions of such bins.

The above-described example illustrates a one-dimensional A-BFD algorithm, where decisions are made primarily based on the capacity or volume size dimension. The A-BFD algorithm may also be extended to solve a multi-dimensional packing problem. For example, apart from the capacity or volume size dimension, a storage allocation may be subject to various requirements relating to read/write throughput, latency, reliability, IOPS, cost, etc. The A-BFD algorithm may be extrapolated to the multi-dimensional vector-packing problem bey picking a weighting function applied to the items to be packed. Each item can be assigned a scalar value, which may be the sum of the weights applied to the different dimensions of the bin. Items may be sorted by their scalar values and selected for packing based on the ordering of their scalar values.

Some embodiments may utilize other algorithms in addition to or in place of A-BFD. Various heuristics algorithms may be used, including geometric heuristics which take into account an item's demand as well as how well an item aligns with the remaining capacities in a bin. In addition, to quickly improve and solve solutions of a very large-scale such as those involving resource allocation in cloud computing environments and SDDCs, local search approaches may be utilized to apply small modifications and derive feasible vector packing solutions. In other words, local search may be utilized to narrow a very large set of possible solutions to a more manageable subset of solutions.

Figure 4:
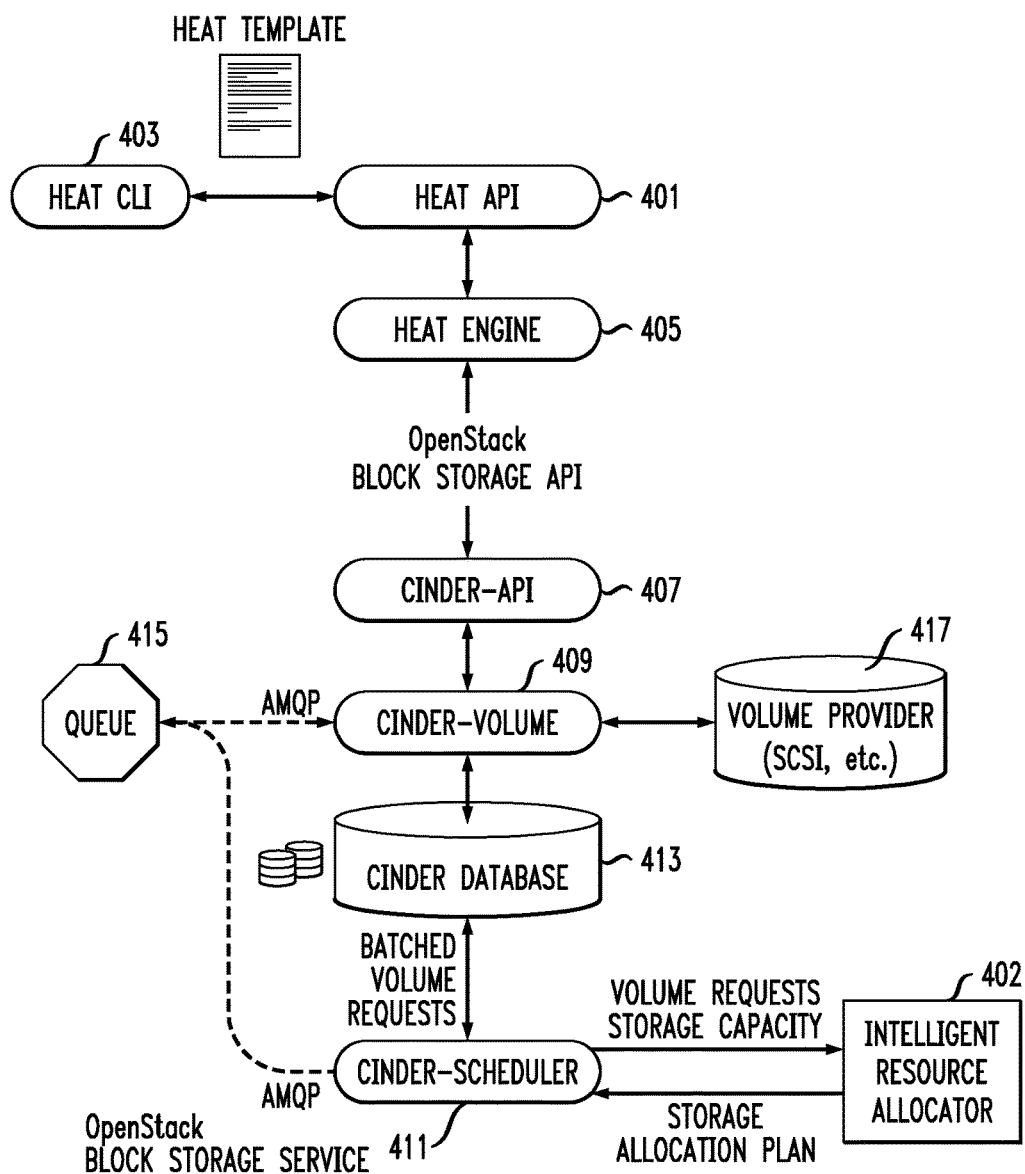
FIG. 4 illustrates another resource allocation system, according to an embodiment of the invention.

FIG. 4 illustrates a storage allocation system 400. The system 400 utilizes an intelligent resource allocator 402, which may be configured in a manner similar to that of the intelligent resource allocator 102 in system 100 and the intelligent resource allocator 202 in system 200. The system 400 is implemented in a computing environment which utilizes Heat in an OpenStack Orchestration for managing IaaS. Embodiments, however, are not limited solely to computing environments which utilize Heat and OpenStack.

In the system 400, a storage request is accepted and fulfilled as described below. Resource requests are received in OpenStack and submitted to the Heat API 403 via the Heat command line interface (CLI) 403. The application request may be in the form of a predefined template. The heat API 401 delivers the Heat template to the Heat engine 405. The Heat engine 405 parses the content and makes corresponding invocations to other OpenStack components.

For storage allocation, OpenStack Block Storage APIs may be utilized. As an example the Cinder subsystem may be utilized. The Cinder subsystem includes the cinder-API 407, cinder-volume 409, cinder-scheduler 411 and cinder database 413. Volume requests are fulfilled by the Cinder subsystem, and LUN placement is determined by the cinder-scheduler 411. Volume requests may be submitted to cinder-volume 409 and cinder-scheduler 411 by the cinder-api 407 via queue 415 using the Advanced Message Queuing Protocol (AMQP).

In some embodiments, the cinder-scheduler 411 makes storage allocation decisions based on batches of LUN requests. For example, the cinder-scheduler 411 may batch all requests received in a given time window, such as all the requests from a same Heat template. Batched requests are delivered to the intelligent resource allocator 402, along with the capacity of the storage infrastructure. The intelligent resource allocator 402 executes an allocation algorithm and responds with an allocation plan or storage configuration, which is then applied to the storage backend such as volume provider 417. The volume provider 417 is the entity which provides the volume storage. The volume provider 417 may be, by way of example, an Internet Small Computer System Interface (iSCSI) device.

Figure 5:
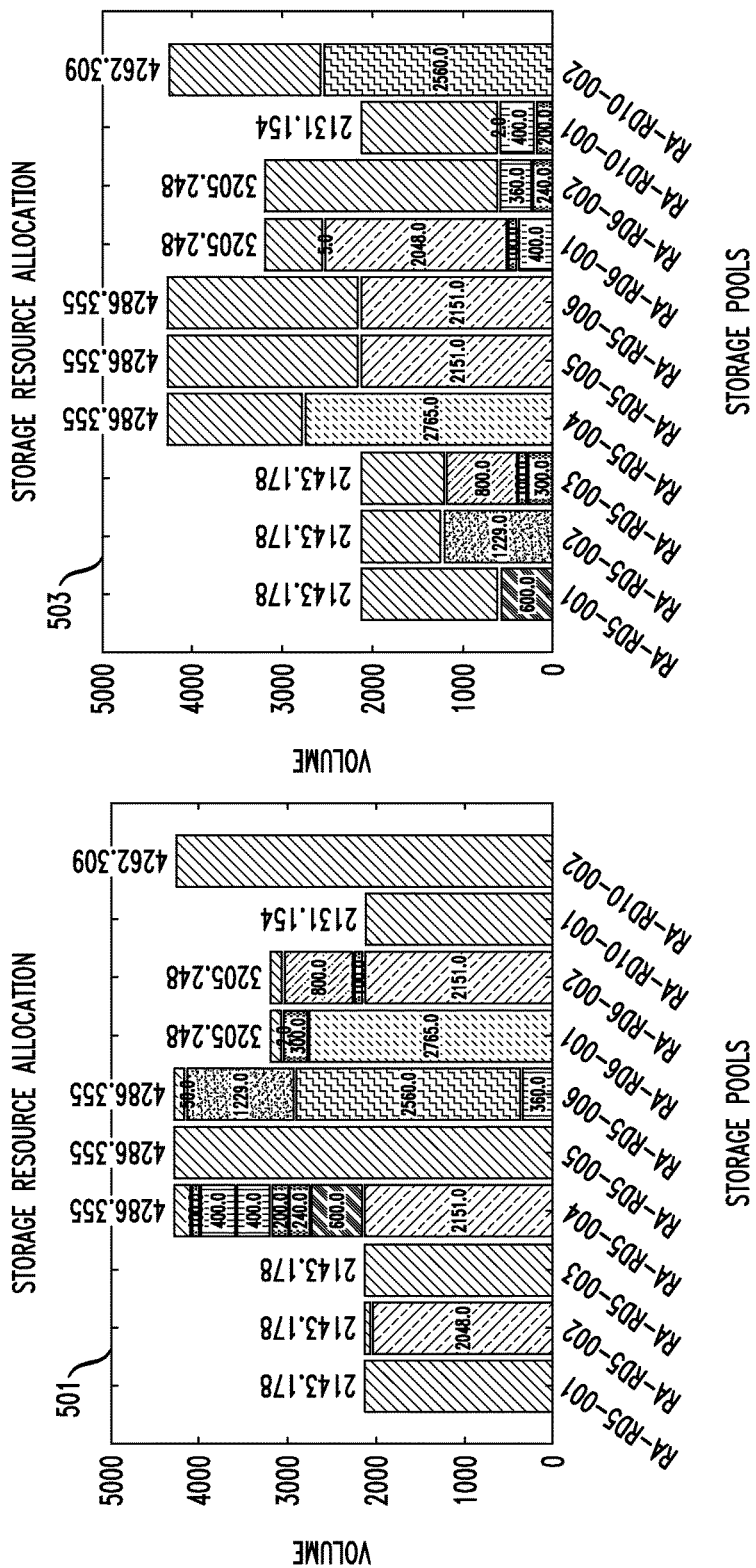
FIG. 5 illustrates examples of storage resource allocation, according to an embodiment of the invention.
Figure 6:
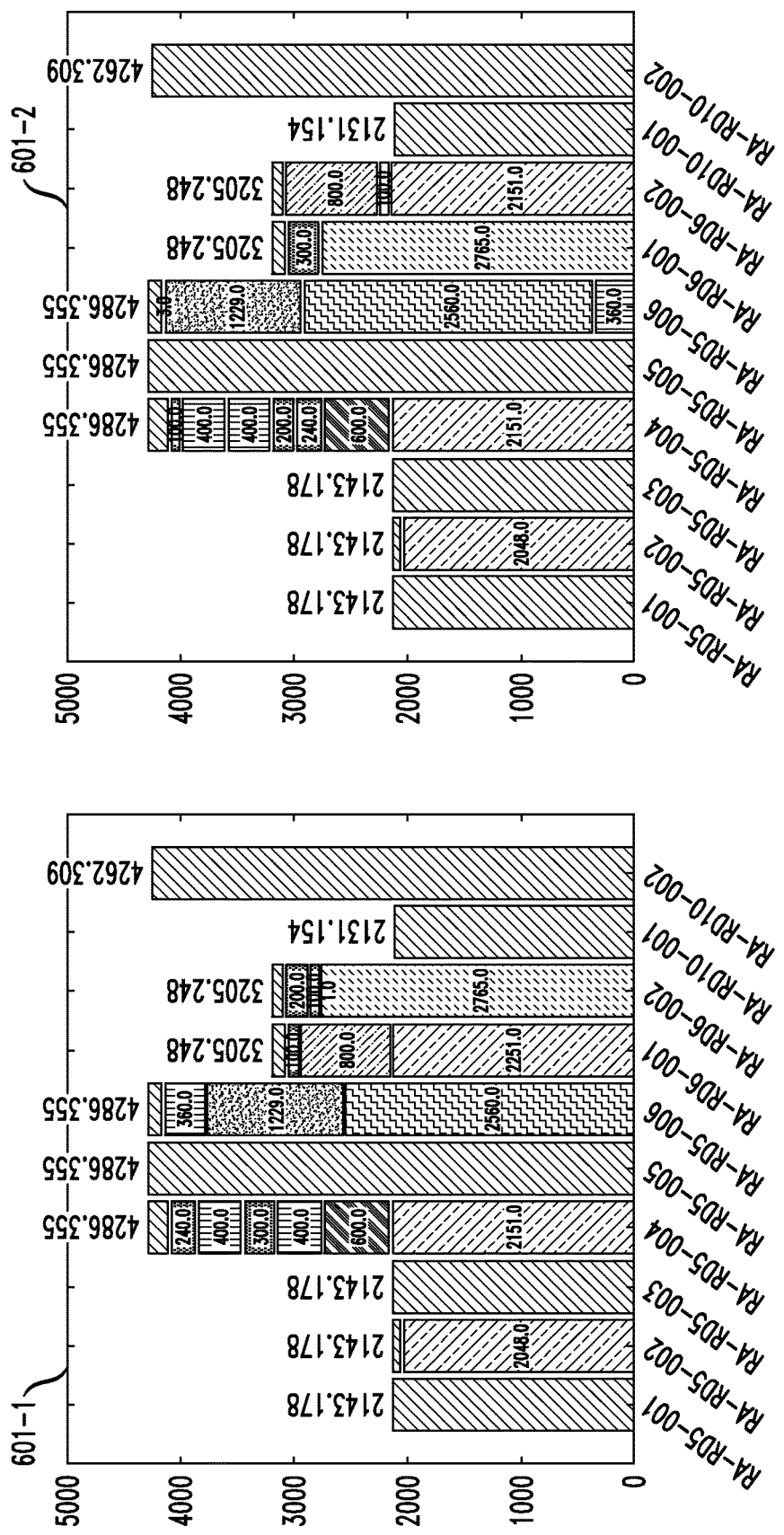
FIG. 6 illustrates examples of storage resource allocation, according to an embodiment of the invention.
Figure 6:
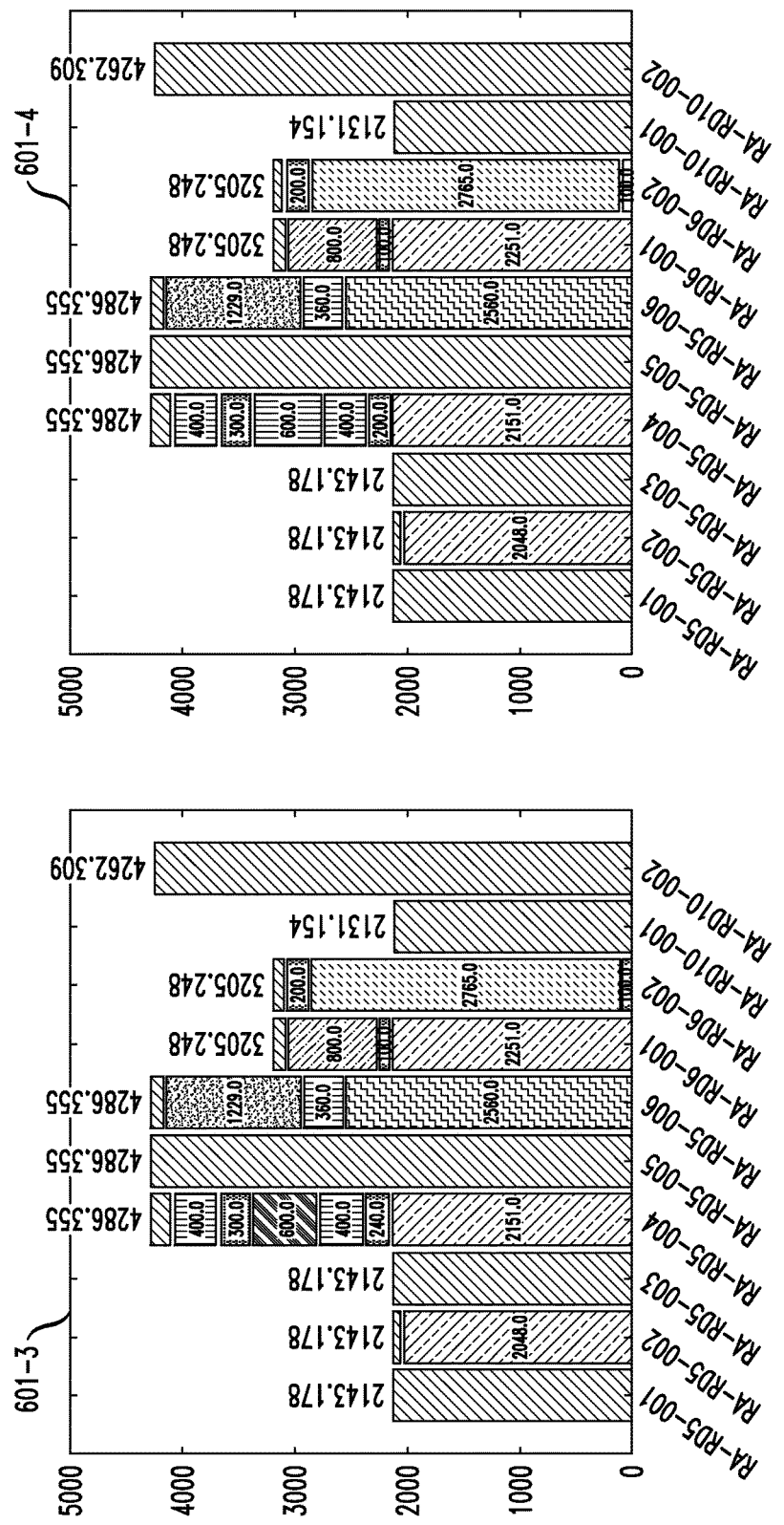
Figure 6:
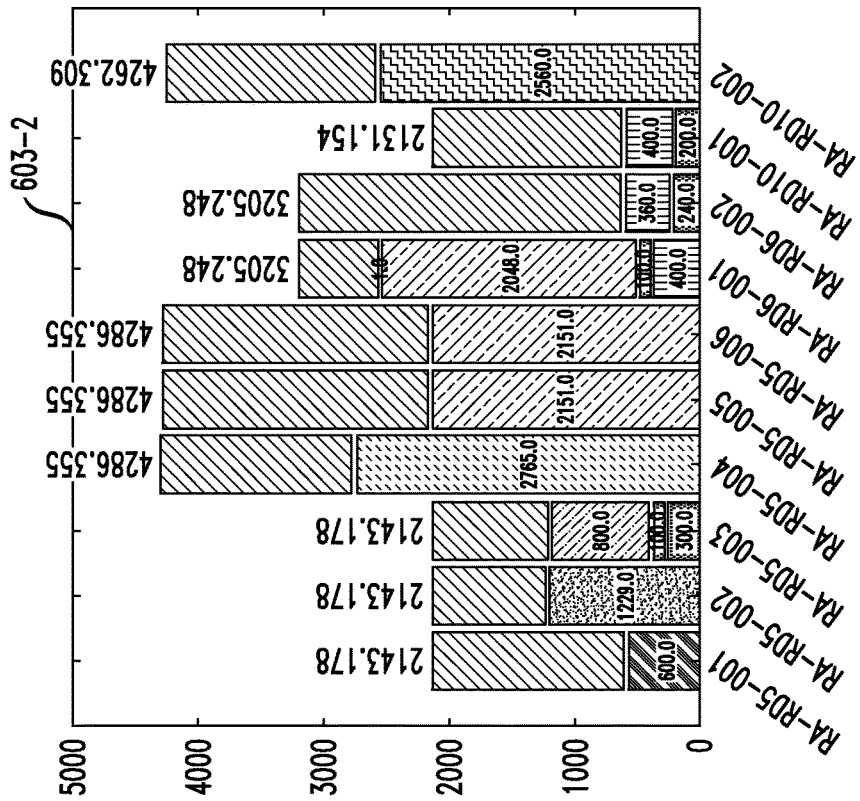
Figure 6:
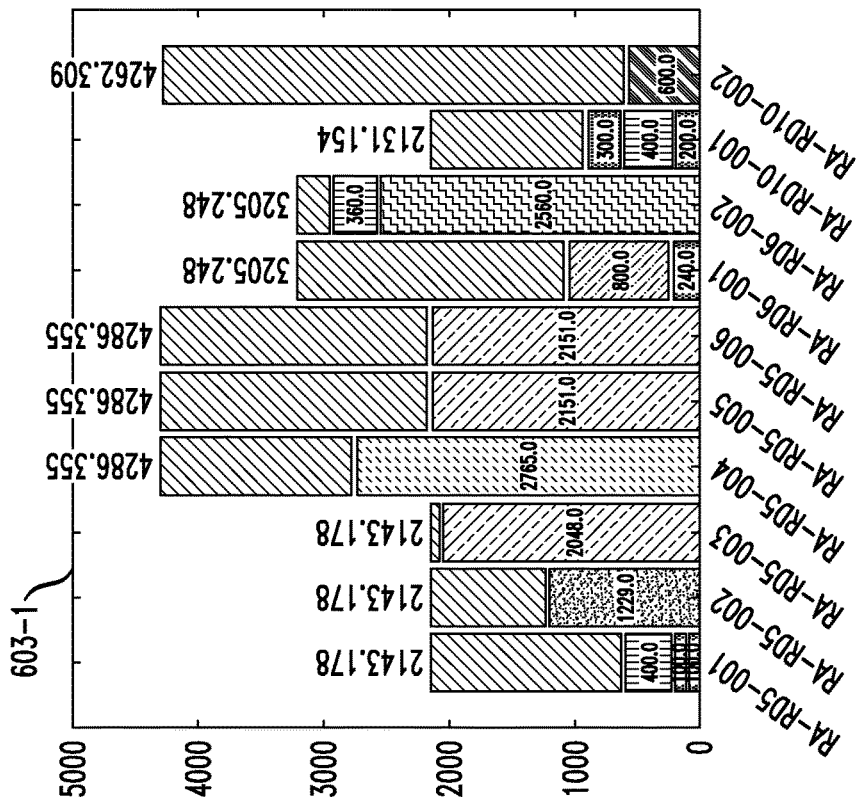
Figure 6:
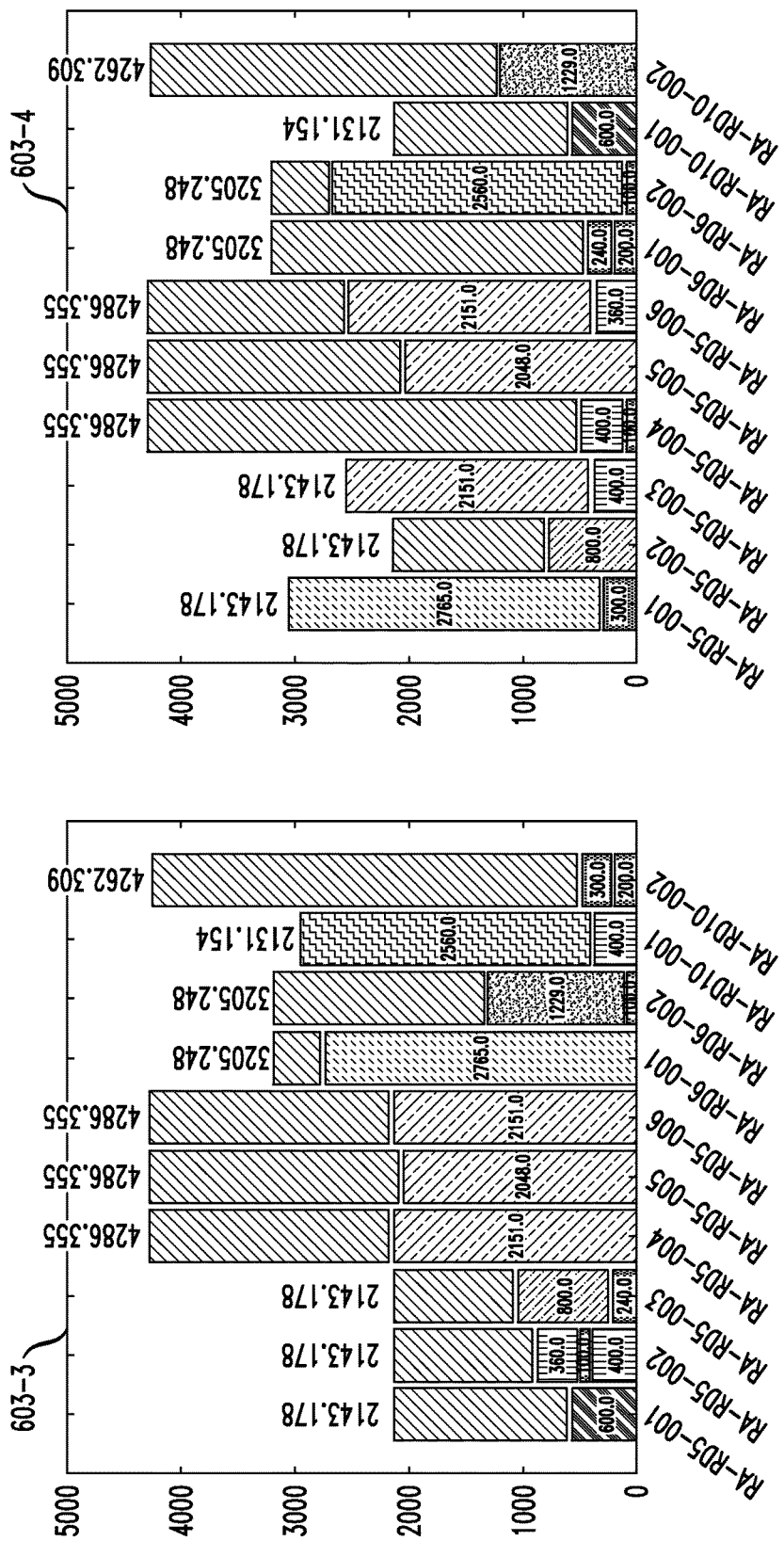

FIGS. 5 and 6 illustrate storage resource allocations utilizing the system 400 and a set of storage resource requirements in a real-world VNX environment. The resource specifications include a Virtualized SharePoint farm, a Pivotal Data Computing Appliance (DCA) Storage Area Network (SAN) Mirror application and an SQL Server Data Warehouse.

The Virtualized SharePoint farm uses separate LUNs for storing content, for services, for searching and for other miscellaneous purposes, with the volume size generally ranging from a few hundred gigabytes (GB) to a few terabytes (TB). In the particular examples shown in FIGS. 5 and 6, the Virtualized SharePoint farm includes five content databases (ContentDB) 2000, 1000, 500, 300 and 200 having respective volume sizes of 2.5 TB, 1.2 TB, 600 GB, 360 GB and 240 GB. The Virtualized SharePoint farm also includes a services database (ServicesDB Log) having a volume size of 100 GB, a search database (SearchDB) having a volume size of 300 GB and miscellaneous database (ConfAdminMisc) having a volume size of 200 GB. The database server of the Virtualized SharePoint farm has an OS volume having a volume size of 800 GB. The Virtualized SharePoint farm also includes two application servers, each of which utilizes an OS volume having a 400 GB volume size.

The Pivotal DCA SAN Mirror application uses large volume LUNs to mirror the storage for a segment server, a master server and a secondary master server having respective volume sizes of 2.7 TB, 2.1 TB and 2.1 TB in this particular example.

The SQL Server Data Warehouse consumes LUNs for both database and log persistence. In the particular examples shown in FIGS. 5 and 6, the SQL Server Data Warehouse includes DatabaseLUN having a volume size of 2 TB, LogLUN having a volume size of 5 GB, TempDBData having a volume size of 100 GB and TempDBLog having a volume size of 2 GB.

The storage allocation depends in part on the order in which the storage requests for the Virtualized SharePoint farm, the Pivotal DCA SAN Mirror and the SQL Server Data warehouse are submitted. In the FIG. 5 example, the storage requests are submitted in the following sequence: (1) Pivotal DCA SAN Mirror; (2) Virtualized SharePoint farm and (3) SQL Server Data Warehouse.

Plot 501 shows the storage allocation utilizing the above-described A-BFD algorithm, while plot 503 shows a storage allocation generated utilizing the default scheduler of OpenStack Cinder. As shown in plot 501, the A-BFD algorithm generates a valid storage allocation. The LUN allocation utilizing the A-BFD algorithm in plot 501 is much more consolidated relative to the LUN allocation utilizing the default scheduler of OpenStack Cinder as shown in plot 503. Plot 501 shows that the utilization of storage pools is over 95% utilizing the A-BFD algorithm, as compared to 51% in plot 503 utilizing the default scheduler of OpenStack Cinder. In this particular example, the A-BFD algorithm provides significant cost savings (approximately 50%) relative to use of the default scheduler of OpenStack Cinder, as the storage pools to which no LUN is assigned can be excluded from a fixed cost calculation. For such storage pools, various mechanisms are available, such as disk spin down and other power-saving approaches, to keep costs at a minimum.

FIG. 6 shows plots of storage allocations for each of the six sequences in which the Pivotal DCA SAN Mirror, Virtualized SharePoint farm and SQL Server Data Warehouse requests may be submitted. The plots 601-1 through 601-6 illustrate the storage allocation generated utilizing the A-BFD algorithm for the respective sequences, while the plots 603-1 through 603-6 shows the storage allocations generated by the default schedule of OpenStack Cinder for the respective sequences.

As illustrated in the FIG. 6 plots, the A-BFD algorithm provides for compact storage allocations, which generally use fewer storage pools relative to the storage allocations generated by the default scheduler of OpenStack Cinder. In addition, the A-BFD algorithm always yields valid allocation schemes, in part due to use of the predictive model which predicts metadata overhead incurred from each allocated LUN. The default scheduler of OpenStack Cinder may oversubscribe the capacity of a storage pool in some cases as shown in FIG. 6.

FIG. 7 illustrates a methodology 700 for resource allocation, according to an embodiment of the invention.

As shown in step 702, a specification of resource requirements is received.

In step 704, one or more resource configurations for a computing environment are generated that satisfy the specification of resource requirements utilizing a description of available resources in the computing environment.

In step 706, a model is utilized to estimate a level of service for each of the resource configurations, where the model predicts behavioral dependencies between attributes of the resources in the computing environment.

In step 708, a given one of the resource configurations is selected based at least in part on the estimated levels of service. Resources in the computing environment are assigned according to the selected configuration of resources in step 710.

Embodiments provide various advantages for resource allocation. Various embodiments described above utilize a generic framework which may be applied for allocation of resources, including storage, compute and networking resources of a cloud computing environment or SDDC. Some embodiments, as described above, match multi-dimensional resource specifications with multi-dimensional resources having various capabilities. Manual resource configuration in large-scale computing environments, as detailed above, is a difficult task. Embodiments utilize various algorithms for automating resource allocation, including by way of example the multi-dimensional constrained bin-packing optimization algorithms, to generate optimal or near-optimal resource allocations while minimizing or reducing one or more desired parameters such as operating cost.

Some embodiments utilize the A-BFD algorithm, which is a heuristic algorithm in which items are packed into bins with different volumes and fixed costs. The A-BFD algorithm, as detailed herein, is well suited for capacity-based storage allocation with heterogeneous storage pools and may be scaled to multiple-constraint or multi-dimensional allocations utilizing geometric heuristics and local search approaches.

An example of a processing platform on which a resource allocation system (e.g., the system 100 of FIG. 1, the system 200 of FIG. 2 and the system 400 of FIG. 4) can be implemented is processing platform 800 shown in FIG. 8. The processing platform 800 in this embodiment comprises a plurality of processing devices, denoted 802-1, 802-2, 802-3, . . . 802-N, which communicate with one another over a network 804. It is to be appreciated that the methodologies described herein may be executed in one such processing device 802, or executed in a distributed manner across two or more such processing devices 802. It is to be further appreciated that a server, a client device, a computing device or any other processing platform element may be viewed as an example of what is more generally referred to herein as a "processing device." As illustrated in FIG. 8, such a device generally comprises at least one processor and an associated memory, and implements one or more functional modules for instantiating and/or controlling features of systems and methodologies described herein. Multiple elements or modules may be implemented by a single processing device in a given embodiment.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random access memory (RAM), read-only memory (ROM) or other types of memory, in any combination. The one or more software programs when executed by a processing device such as the processing device 802-1 causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the network 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the resource allocation systems 100, 200 and 400 shown in FIGS. 1, 2 and 4, respectively, may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

Furthermore, it is to be appreciated that the processing platform 800 of FIG. 8 can comprise VMs implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 800 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 800 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and Symmetrix VMAX (commercially available from EMC Corporation, Hopkinton, Mass.). A variety of other computing and storage products may be utilized to implement the one or more services that provide the functionality and features described herein.

It was noted above that portions of the systems 100, 200 and 400 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   receiving a specification of resource requirements comprising a specification of storage requirements as a set of logical units (LUNs) to be allocated to storage pools in a computing environment;
   generating one or more resource configurations for the computing environment that satisfy the specification of resource requirements utilizing a description of available resources in the computing environment, wherein each resource configuration is a tentative allocation of resources;
   utilizing a model to estimate a level of service for each of the resource configurations, wherein the model predicts behavioral dependencies between attributes of the resources in the computing environment;
   predicting one or more transition costs for applying respective ones of the resource configurations based on at least one existing service level objective (SLO) for the computing environment, and providing the predicted one or more transition costs as one or more transition SLO impacts;
   combining the one or more resource configurations with corresponding ones of the one or more transition SLO impacts to produce one or more overall costs, wherein each overall cost comprises a sum of a cost of its corresponding resource configuration and predicted transition cost;
   selecting a given one of the resource configurations based at least in part on the one or more overall costs, wherein the selected resource configuration is associated with a lowest overall cost; and
   assigning resources in the computing environment according to the selected configuration of resources;
   wherein the method is performed by one or more processing devices each comprising a processor operatively coupled to a memory.

2. The method of claim 1, wherein the computing environment comprises a software-defined data center.

3. The method of claim 1, wherein the computing environment comprises a cloud computing environment.

4. The method of claim 1, further comprising utilizing one or more monitoring tools associated with the computing environment to identify remedial actions for service level objective violations determined based on the predicted transition costs.

5. The method of claim 1, wherein each LUN in the set of LUNs has one or more service level agreement constraints associated therewith.

6. The method of claim 1, wherein selecting the given one of the resource configurations is further based at least in part on overall storage costs associated with respective ones of the resource configurations, the overall storage cost associated with a resource configuration comprising a sum of operating costs for the set of LUNs.

7. The method of claim 6, wherein selecting the given one of the resource configurations is further based at least in part on metadata overhead for each LUN allocation in the resource configurations.

8. The method of claim 1, wherein the sorting operation is an adapted best fitting decreasing (A-BFD) algorithm, and wherein employing the A-BFD algorithm comprises:
   ordering the set of LUNs in a non-increasing order of their respective volume sizes;
   selecting each LUN of the set from largest volume size to smallest volume size based on the ordering;
   mapping each selected LUN to a given one of the storage pools having at least one LUN mapped thereto; and
   if mapping the selected LUN to the given storage pool fails, selecting a new storage pool and mapping the selected LUN to the new storage pool.

9. The method of claim 8, wherein the given storage pool is selected from among storage pools having at least one LUN mapped thereto based on free space available.

10. The method of claim 8, wherein the new storage pool is selected from among storage pools not having at least one LUN mapped thereto based on a ratio of cost to volume size of the storage pools.

11. The method of claim 1, wherein each storage pool in the computing environment has two or more dimensions associated therewith, and wherein two or more of the storage pools have different values of at least one of the two or more dimensions.

12. The method of claim 11, wherein the two or more dimensions comprise volume size and cost.

13. The method of claim 12, wherein the two or more dimensions further comprise at least one of: throughput, latency, and input/output operations per second.

14. The method of claim 11, wherein the sorting operation is an adapted best fitting decreasing (A-BFD) algorithm, and wherein employing the A-BFD algorithm comprises:
   assigning a scalar value to each of the LUNs based on weights assigned to respective ones of the two or more dimensions;
   ordering the LUNs based on the scalar values;
   selecting, in a sequential order from largest scalar value to smallest scalar value, respective ones of the LUNs; and
   mapping each selected LUN to one of the storage pools.

15. The method of claim 14, wherein mapping the selected LUN to one of the storage pools comprises:
   mapping each selected LUN to a given one of the storage pools having at least one LUN mapped thereto; and
   if mapping the selected LUN to the given storage pool fails, selecting a new storage pool from among storage pools not having at least one LUN mapped thereto and mapping the selected LUN to the new storage pool.

16. The method of claim 11, wherein mapping each selected LUN comprises utilizing geometric heuristics based on matching values of dimensions for the selected LUN to corresponding dimensions in respective ones of the storage pools.

17. The method of claim 11, wherein mapping each selected LUN comprises utilizing local search to narrow possible storage pools for the selected LUN.

18. An article of manufacture comprising a processor-readable storage medium having encoded therein executable code of one or more software programs, wherein the one or more software programs when executed by one or more processing devices cause the one or more processing devices to:
  receive a specification of resource requirements comprising a specification of storage requirements as a set of logical units (LUNs) to be allocated to storage pools in a computing environment;
  generate one or more resource configurations for the computing environment that satisfy the specification of resource requirements utilizing a description of available resources in the computing environment, wherein each resource configuration is a tentative allocation of resources, and wherein generating each resource configuration comprises employment of a sorting operation accounting for at least one dimension associated with the storage pools in the computing environment;
  utilize a model to estimate a level of service for each of the resource configurations, wherein the model predicts behavioral dependencies between attributes of the resources in the computing environment;
  predict one or more transition costs for applying respective ones of the resource configurations based on at least one existing service level objective (SLO) for the computing environment, and provide the predicted one or more transition costs as one or more transition SLO impacts;
  combine the one or more resource configurations with corresponding ones of the one or more transition SLO impacts to produce one or more overall costs, wherein each overall cost comprises a sum of a cost of its corresponding resource configuration and predicted transition cost;
  select a given one of the resource configurations based at least in part on the one or more overall costs, wherein the selected resource configuration is associated with a lowest overall cost; and
  assign resources in the computing environment according to the selected configuration of resources.

19. An apparatus comprising:
a memory; and
a processor operatively coupled to the memory and configured to:
  receive a specification of resource requirements comprising a specification of storage requirements as a set of logical units (LUNs) to be allocated to storage pools in a computing environment;
  generate one or more resource configurations for the computing environment that satisfy the specification of resource requirements utilizing a description of available resources in the computing environment, wherein each resource configuration is a tentative allocation of resources, and wherein generating each resource configuration comprises employment of a sorting operation accounting for at least one dimension associated with the storage pools in the computing environment;
  utilize a model to estimate a level of service for each of the resource configurations, wherein the model predicts behavioral dependencies between attributes of the resources in the computing environment;
  predict one or more transition costs for applying respective ones of the resource configurations based on at least one existing service level objective (SLO) for the computing environment, and provide the predicted one or more transition costs as one or more transition SLO impacts;
  combine the one or more resource configurations with corresponding ones of the one or more transition SLO impacts to produce one or more overall costs, wherein each overall cost comprises a sum of a cost of its corresponding resource configuration and predicted transition cost;
  select a given one of the resource configurations based at least in part on the one or more overall costs, wherein the selected resource configuration is associated with a lowest overall cost; and
  assign resources in the computing environment according to the selected configuration of resources.

* * * * *